(12) United States Patent
Zhou

(10) Patent No.: US 12,209,032 B1
(45) Date of Patent: Jan. 28, 2025

(54) OUTDOOR WATER PURIFIER

(71) Applicant: Shenzhen Avatar E-commerce Co., Ltd, Shenzhen (CN)

(72) Inventor: Jianrong Zhou, Shenzhen (CN)

( * ) Notice: Subject to any disclaimer, the term of this patent is extended or adjusted under 35 U.S.C. 154(b) by 0 days.

(21) Appl. No.: 18/747,386

(22) Filed: Jun. 18, 2024

(51) Int. Cl.
*C02F 1/00* (2023.01)

(52) U.S. Cl.
CPC ........ *C02F 1/002* (2013.01); *C02F 2201/002* (2013.01); *C02F 2201/009* (2013.01)

(58) Field of Classification Search
CPC ................ C02F 1/002; C02F 2201/002; C02F 2201/009
See application file for complete search history.

(56) References Cited

U.S. PATENT DOCUMENTS

| | | | | |
|---|---|---|---|---|
| 5,106,495 A | * | 4/1992 | Hughes | C02F 9/20 210/748.11 |
| 2015/0096937 A1 | * | 4/2015 | Munro | C02F 1/441 |
| 2019/0321784 A1 | | 10/2019 | Dunham et al. | |
| 2023/0083946 A1 | * | 3/2023 | Favorel | B01D 61/18 210/86 |

FOREIGN PATENT DOCUMENTS

| | | | |
|---|---|---|---|
| WO | WO 2013/115763 A2 | * | 8/2013 |
| WO | WO 2015/106233 A1 | * | 7/2015 |

* cited by examiner

*Primary Examiner* — John Kim
(74) *Attorney, Agent, or Firm* — Ying-Ting Chen; Law Office of Michael Chen

(57) ABSTRACT

An outdoor water purifier includes a housing, a filter element, a water pump and a battery; the filter element, the water pump and the battery are all provided in the housing, the housing includes an upper cover, a front shell and a rear shell, a water inlet is provided at the bottom of the rear shell and is connected to the water pump, the water pump is connected to the filter element, the water pump is used to pump the water to be purified from the water inlet to the filter element, a water outlet connected to the filter element is provided at the top of the upper cover, a solar panel is embedded on the front shell, the solar panel is connected to the battery, and a hand-cranked power generation structure connected to the battery is provided on the rear shell.

8 Claims, 4 Drawing Sheets

OUTDOOR WATER PURIFIER

FIELD OF THE INVENTION

The present invention relates to the field of water purifiers, and in particular to an outdoor water purifier.

BACKGROUND OF THE INVENTION

An outdoor water purifier is a drinking water guarantee device that is convenient to carry when engaging in outdoor activities. It does not need to be installed on the faucet and does not require tap water pressure during use, it can immediately purify outdoor rainwater, stream water, river water, lake water and other natural water into safe drinking water that is sterile, free of suspended pollutants and other harmful substances, and can be directly drunk. At present, some outdoor water purifiers use a water pump to suck water into the filter element for filtering and purifying water, for this type of outdoor water purifier, it is generally necessary to use a battery to power the water pump and it is necessary to frequently replace or charge the battery during use. If it needs to be used temporarily after being placed for a long time, the battery is prone to running low on power, resulting in the water pump not being able to work normally, affecting the use of the outdoor water purifier.

SUMMARY OF THE DISCLOSURE

The purpose of this invention is to provide an outdoor water purifier with solar charging function and hand-cranked power generation function to ensure that the water purifier can work normally outdoors.

In order to achieve the above purpose, the technical solution adopted by the present invention is: an outdoor water purifier comprises a housing, a filter element, a water pump and a battery, the filter element, the water pump and the battery are all provided in the housing, the housing comprises an upper cover, a front shell and a rear shell, a water inlet is provided at the bottom of the rear shell, the water inlet is connected to the water pump, the water pump is connected to the filter element and is used to pump the water to be purified from the water inlet to the filter element, a water outlet connected to the filter element is provided on the top of the upper cover, a solar panel is embedded in the front shell, the solar panel is connected to the battery, and a hand-cranked power generation structure connected to the battery is provided on the rear shell.

By adopting the above technical solution, the solar panel allows the battery to be charged when the water purifier is in a sunny environment. In addition, the hand-cranked power generation structure allows the battery to be charged even in an environment without sunlight, so that the battery of water purifier can be charged in different environments to ensure the normal use of the water purifier.

Preferably, a PCB board is provided at the bottom of the upper cover, a water purification button is provided on the upper cover, a USB interface is provided on one side of the upper cover, the USB interface is connected to the battery, and the upper cover is also provided with an interface protection cover for covering the USB interface.

By adopting the above solution, the USB interface enables consumers to charge the battery by connecting the power source with USB interface, which makes the charging of the water purifier more convenient.

Preferably, a lighting lamp is also provided on the housing, one side of the lighting lamp is embedded in the rear shell, the other side of the lighting lamp is embedded in the front shell, the lighting lamp is connected to the PCB board, and a lighting button for turning on and off the lighting lamp is provided on the upper cover.

By adopting the above technical solution, the lighting lamp enables the water purifier to have a lighting function, and consumers can use the lighting lamp when they are in a dark environment.

Preferably, a hanging rope buckle is also provided on the front shell.

By adopting the above solution, consumers can use the hanging rope to pass through the hanging rope buckle, making it more convenient to carry the water purifier.

Preferably, a silicone base is provided at the bottom of the housing, and the silicone base covers the water inlet.

By adopting the above solution, when water purification is needed, the silicone base is opened to expose the water inlet, so that the water to be purified enters the water purifier from the water inlet. The silicone base is beneficial for protecting the water inlet.

Preferably, a bracket is provided on the rear shell, the bracket is fixedly connected to the inside of the rear shell by bolts, and the filter element, the battery and the water pump are all installed on the bracket.

By adopting the above solution, the bracket makes the installation of the filter element, the battery and the water pump more stable.

Preferably, the hand-cranked power generation structure includes a generator set installed in the rear shell, the generator set is connected to the battery, a generator rocker and a linkage shaft are provided on the outside of the rear shell, one end of the generator rocker is hinged to the linkage shaft, the linkage shaft is installed in the rear shell through a bearing, and the linkage shaft passes through the rear shell and is connected to the generator set.

By adopting the above solution, when in use, the generator rocker is rotated to drive the linkage shaft to rotate, then the linkage shaft drives the gears in the generator set to rotate, so as to achieve the charging of the battery, in this way, the battery can be charged at any time to ensure the normal use of the water purifier.

Preferably, a handle is provided at one end of the power generating rocker away from the linkage shaft.

By adopting the above solution, the handle makes it easier and more convenient for consumers to turn the generator rocker.

In summary, the beneficial technical effects of this invention are:
1. The solar panel allows the battery to be charged when the water purifier is in a sunny environment. In addition, the hand-cranked power generation structure allows the battery to be charged even in an environment without sunlight, so that the battery of water purifier can be charged in different environments to ensure the normal use of the water purifier.
2. The lighting lamp enables the water purifier to have a lighting function, and consumers can use the lighting lamp when they are in a dark environment; the hanging rope buckle enables consumers to use a hanging rope to pass through the hanging rope buckle, making the water purifier more convenient to carry.

DETAILED DESCRIPTION OF THE PREFERRED EMBODIMENTS

Other features, objects and advantages of the present invention will be more clearly and completely by the detailed description of the non-limiting embodiments with reference to the attached drawings (FIG. 1 to FIG. 4). Obviously, the described embodiments are only part of the embodiments of the present invention, but not all of them. Based on the embodiments of the present invention, all other embodiments obtained by ordinary technicians in the field without creative labor are within the scope of the present invention.

Figure 1:
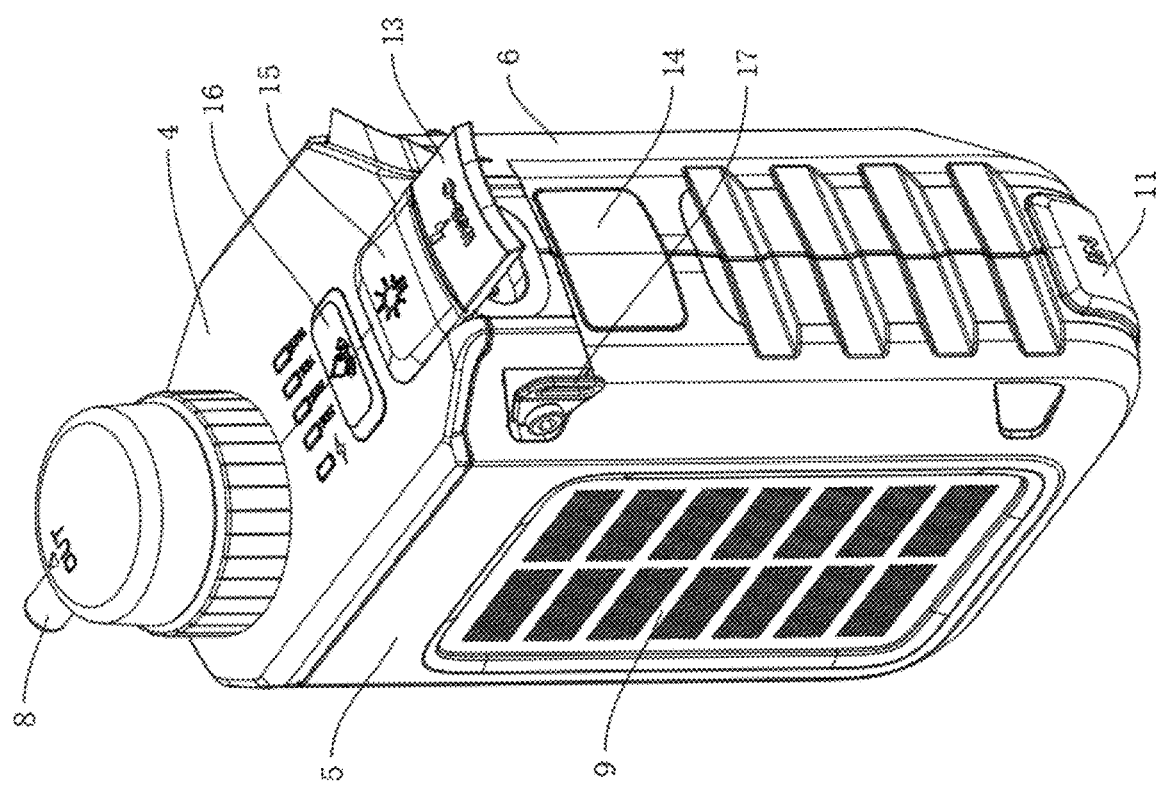
FIG. 1 is a schematic structural view of the outdoor water purifier in the present invention.
Figure 2:
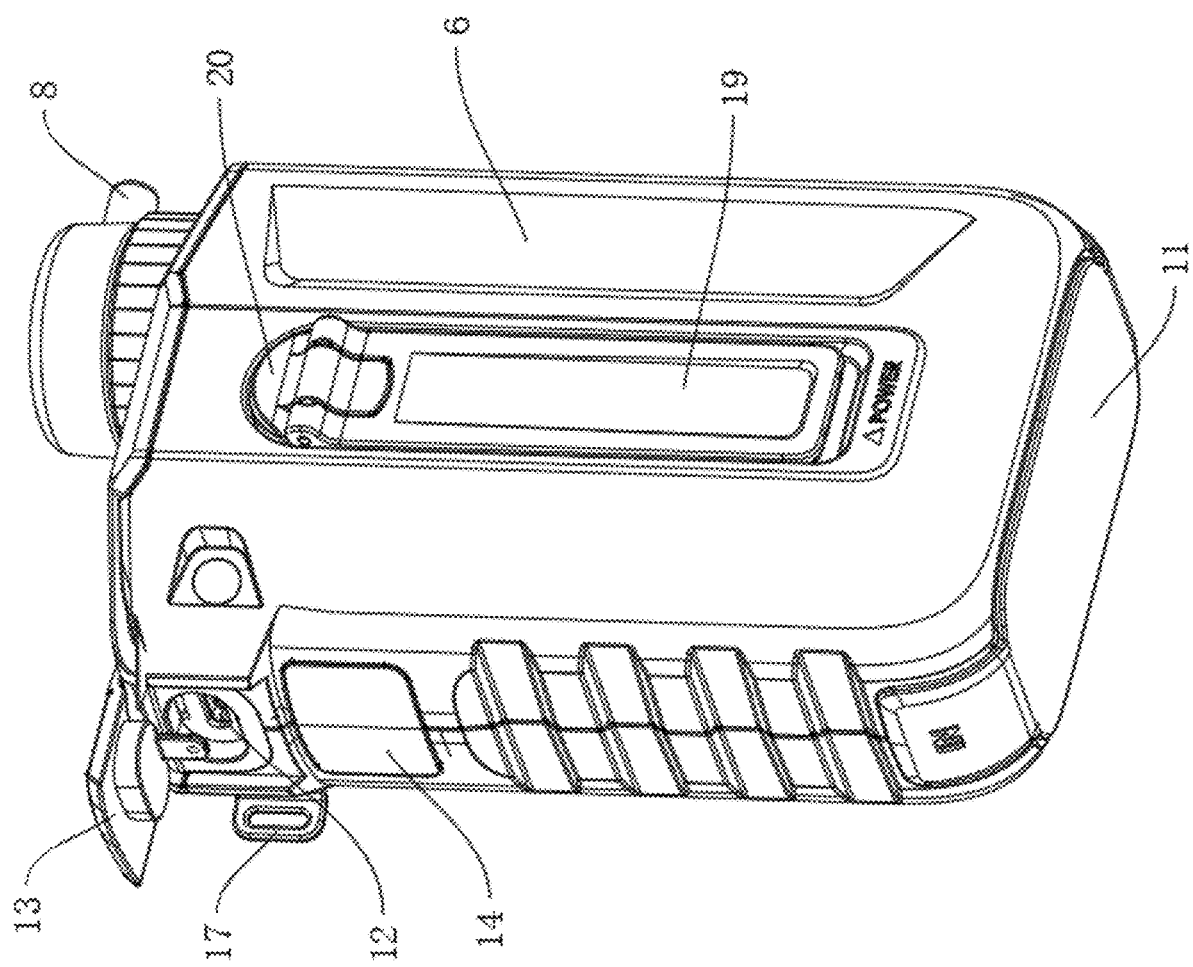
FIG. 2 is a schematic structural view of the outdoor water purifier from another angle in the present invention.
Figure 3:
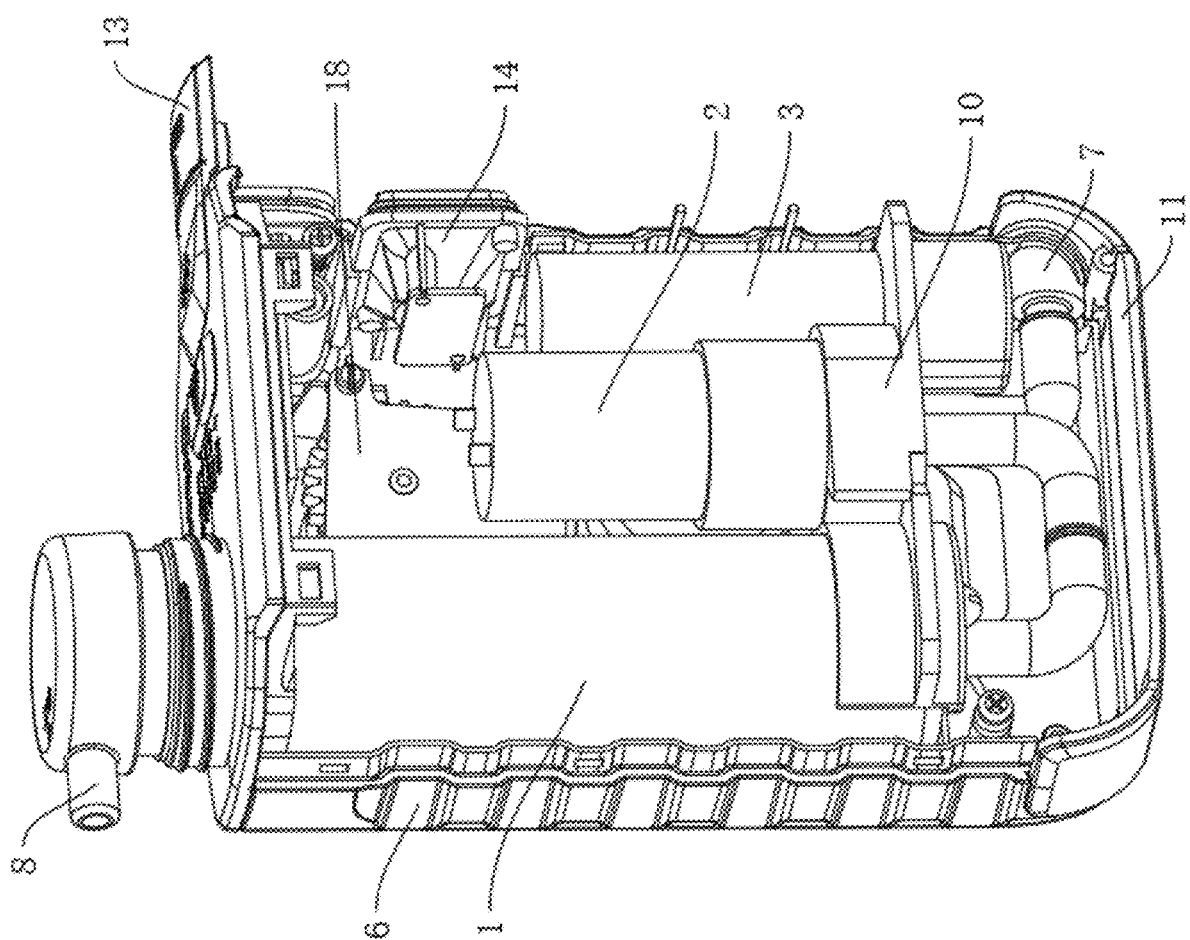
FIG. 3 is a schematic view of the internal structure of the outdoor water purifier in the present invention.

The present application discloses an outdoor water purifier, as shown in FIGS. 1 to 3, comprising a housing, a filter element 1, a water pump 2 and a battery 3, the filter element 1, the water pump 2 and the battery 3 are all provided in the housing, the housing comprises an upper cover 4, a front shell 5 and a rear shell 6, the front shell 5 and the rear shell 6 are assembled by buckling and screws, a water inlet 7 is provided at the bottom of the rear shell 6, the water inlet 7 is connected to the water pump 2, the water pump 2 is connected to the filter element 1, the water pump 2 is used to pump the water to be purified from the water inlet 7 to the filter element 1, a water outlet 8 connected to the filter element 1 is provided at the top of the upper cover 4, a solar panel 9 is embedded in the front shell 5, the solar panel 9 is connected to the battery 3, and a hand-cranked power generation structure connected to the battery 3 is arranged on the rear shell 6. The solar panel 9 allows the battery 3 to be charged when the water purifier is in a sunny environment. In addition, the hand-cranked power generation structure allows the battery 3 to be charged even in an environment without sunlight, so that the battery 3 of water purifier can be charged in different environments to ensure the normal use of the water purifier.

Specifically, a bracket 10 is provided on the rear shell 6, the bracket 10 is fixedly connected to the inside of the rear shell 6 by bolts, three installation grooves for installing the filter element 1, the battery 3, and the water pump 2 are opened on the bracket 10, the filter element 1, the battery 3 and the water pump 2 are all installed on the bracket 10 and inserted in the installation grooves. The bracket 10 makes the installation of the filter element 1, the battery 3 and the water pump 2 more stable, a silicone base 11 with a certain elasticity is fixedly installed on the bottom of the housing, the silicone base 11 is embedded in the front shell 5 and the rear shell 6 through a buckle, the silicone base 11 covers the water inlet 7. When water purification is needed, the silicone base 11 is prised until it deforms, thereby exposing the water inlet 7, so that the water to be purified enters the water purifier from the water inlet 7. The silicone base 11 is beneficial for protecting the water inlet 7.

As shown in FIG. 1, a PCB board is provided at the bottom of the upper cover 4, a USB interface 12 is provided on one side of the upper cover 4, the USB interface 12 is connected to the battery 3, and the upper cover 4 is also provided with an interface protection cover 13 for covering the USB interface 12. The USB interface 12 enables consumers to charge the battery 3 by connecting the power source with USB interface 12, which makes the charging of the water purifier more convenient. A lighting lamp 14 is provided on the housing, one side of the lighting lamp 14 is embedded in the rear shell 6, the other side of the lighting lamp 14 is embedded in the front shell 5, the lighting lamp 14 is connected to the PCB board, and a lighting button 15 for turning on and off the lighting lamp 14 is provided on the upper cover 4. The lighting lamp 14 enables the water purifier to have a lighting function, and the consumer can use the lighting lamp 14 when in a dark environment. In addition, a water purification button 16 and a power indicator light are also provided on the upper cover 4, the water purification button 16 and the power indicator light are both connected to the PCB board, the water purification button 16 is used to control the operation of the water pump 2, the power indicator light is beneficial for consumers to understand the current power of the battery 3 more intuitively, and help consumers to determine whether the water purifier needs to be charged.

In order to make the outdoor water purifier more convenient to carry, a hanging rope buckle 17 is also provided on the front shell 5, the hanging rope buckle 17 is fixed to one side of the front shell 5 by bolts. Consumers can use the hanging rope to pass through the hanging rope buckle 17, thereby making the water purifier more convenient to carry.

Figure 4:
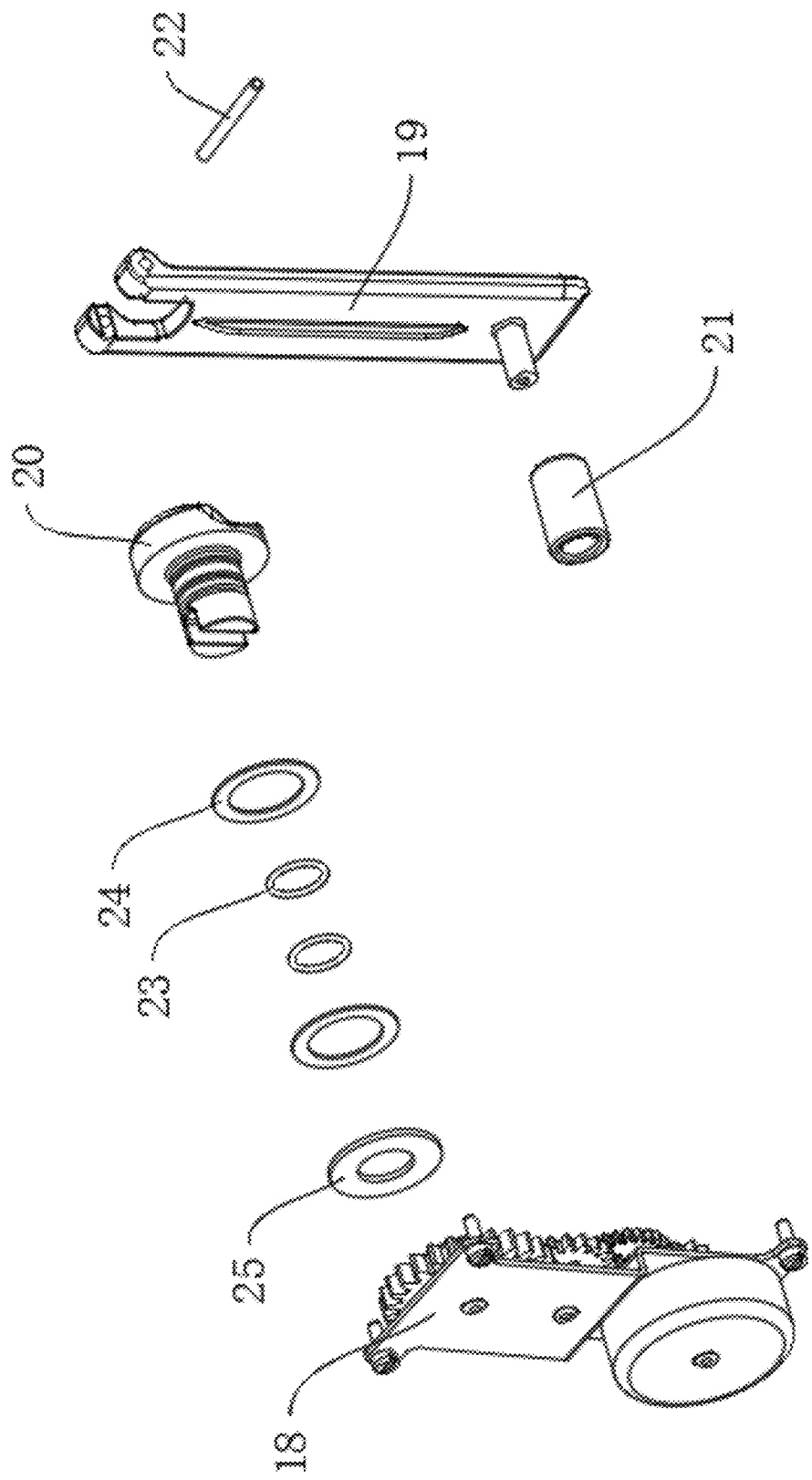
FIG. 4 is an exploded schematic view of the hand-cranked power generation structure in the present invention.

As shown in FIGS. 2 and 4, the hand-cranked power generation structure includes a generator set 18 installed in the rear shell 6, the generator set 18 is connected to the battery 3, a generator rocker 19 and a linkage shaft 20 are provided on the outer side of the rear shell 6, a first accommodating groove for accommodating the generator rocker 19 and the linkage shaft 20 is opened on the outer side of the rear shell 6, the generator rocker 19 is placed in the first accommodating groove to make the appearance of the water purifier more neat, one end of the generator rocker 19 is hinged to the linkage shaft 20, the linkage shaft 20 is installed in the rear shell 6 through a bearing, and the linkage shaft 20 passes through the rear shell 6 and is connected to the generator set 18. When in use, the generator rocker 19 is first turned out from the first accommodating groove, the generator rocker 19 is rotated to drive the linkage shaft 20 to rotate, then the linkage shaft 20 drives the gears in the generator set 18 to rotate, so as to achieve the charging of the battery 3, in this way, the battery 3 can be charged at any time to ensure the normal use of the water purifier. A handle 21 is provided at the end of the generator rocker 19 away from the linkage shaft 20, the shape of the first accommodating groove matches the shape of the generator rocker 19, a second accommodating groove for accommodating the handle 21 is provided in the first accommodating groove on the rear shell 6, the shape of the second accommodating groove matches the handle 21, and the handle 21 is placed in the second accommodating groove in a folded state. When in use, after the generator rocker 19 is turned out of the first accommodating groove, the handle 21 faces the outside of the rear shell 6, the consumer can grasp the handle 21 to turn the rocker, thereby the use of the hand-cranked power generation structure is more convenient and labor-saving.

Specifically, a pin 22 is provided at one end of the generator rocker 19 for connecting with the linkage shaft 20, the pin 22 passes through the generator rocker 19 and the linkage shaft 20 from the side, the pin 22 and the linkage shaft 20 are clearance fit, while the pin 22 and the generator rocker 19 are interference fit, so that the pin 22 can rotate with the generator rocker 19, and the pin 22 is not easy to fall off after installation. The pin 22 is used to realize the hinge connection between the generator rocker 19 and the linkage shaft 20, and makes the assembly more convenient. The sealing ring 23 is sleeved on the linkage shaft 20, and there are two sealing rings 23 in this embodiment, which are provided between the bearing and the linkage shaft 20, the bearing and the linkage shaft 20 squeeze the sealing ring 23 against each other, so that the gap between them is sealed. The gasket 24 is also sleeved on the linkage shaft 20, the gaskets 24 are respectively provided on both sides of the bearing and is made of graphite material in this embodiment, a circlip 25 for fixing the position of the gasket 24 is also sleeved on the end of the linkage shaft 20 facing the generator set 18. The sealing ring 23 makes the connection between the linkage shaft 20 and the outer housing sealed, which is beneficial for better waterproofing.

The implementation principle of this embodiment is:

When using the outdoor water purifier, first open the silicone base 11 at the bottom to expose the water inlet 7, put the water inlet 7 into the water to be purified, then start the water pump 2 through the water purification button 16, the water pump 2 sucks water from the water inlet 7 into the filter element 1, thereby filtering the water to be purified, and finally the purified water can be obtained from the water outlet 8. The solar panel 9 allows the battery 3 to be charged when the water purifier is in a sunny environment, in addition, the hand-cranked power generation structure allows the battery 3 to be charged even in an environment without sunlight, so that the battery 3 of water purifier can be charged in different environments to ensure the normal use of the water purifier.

In the present invention, the terms "comprises/comprising" and the like in the description of the present invention and the attached drawings are used to describe the technical features, numerical values, steps or components. One or more other features, numerical values, steps, components or their combinations based on this invention shall be included in the scope of protection of the present invention.

Hereinafter, embodiments of the present invention has been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. An outdoor water purifier, comprising a housing, a filter element (1), a water pump (2) and a battery (3), wherein the filter element (1), the water pump (2) and the battery (3) are all provided in the housing, the housing comprises an upper cover (4), a front shell (5) and a rear shell (6), a water inlet (7) is provided at the bottom of the rear shell (6), the water inlet (7) is connected to the water pump (2), the water pump (2) is connected to the filter element (1) and is used to pump water to be purified from the water inlet (7) into the filter element (1), a water outlet (8) connected to the filter element (1) is provided at the top of the upper cover (4), a solar panel (9) is embedded in the front shell (5), the solar panel (9) is connected to the battery (3), and a hand-cranked power generation structure connected to the battery (3) is arranged on the rear shell (6).

2. An outdoor water purifier according to claim 1, wherein a PCB board is provided at the bottom of the upper cover (4), a water purification button (16) is provided on the upper cover (4), a USB interface (12) is provided on one side of the upper cover (4), the USB interface (12) is connected to the battery (3), and the upper cover (4) is also provided with an interface protection cover (13) for covering the USB interface (12).

3. An outdoor water purifier according to claim 2, wherein a lighting lamp (14) is provided on the housing, one side of the lighting lamp (14) is embedded in the rear shell (6), the other side of the lighting lamp (14) is embedded in the front shell (5), the lighting lamp (14) is connected to the PCB board, and a lighting button (15) for turning on and off the lighting lamp (14) is provided on the upper cover (4).

4. An outdoor water purifier according to claim 1, wherein a hanging rope buckle (17) is also provided on the front shell (5).

5. An outdoor water purifier according to claim 1, wherein a silicone base (11) is provided at the bottom of the housing, and the silicone base (11) covers the water inlet (7).

6. An outdoor water purifier according to claim 1, wherein a bracket (10) is provided on the rear shell (6), the bracket (10) is fixedly connected to the inside of the rear shell (6) by bolts, and the filter element (1), the battery (3) and the water pump (2) are all installed on the bracket (10).

7. An outdoor water purifier according to claim 1, wherein the hand-cranked power generation structure includes a generator set (18) installed in the rear shell (6), the generator set (18) is connected to the battery (3), the outer side of the rear shell (6) is provided with a generator rocker (19) and a linkage shaft (20), one end of the generator rocker (19) is hinged to the linkage shaft (20), the linkage shaft (20) is installed in the rear shell (6) through a bearing, and the linkage shaft (20) passes through the rear shell (6) and is connected to the generator set (18).

8. An outdoor water purifier according to claim 7, wherein a handle (21) is provided at one end of the generator rocker (19) away from the linkage shaft (20).

\* \* \* \* \*